United States Patent Office 3,376,117
Patented Apr. 2, 1968

3,376,117
N,N-DIFLUOROAMINOSULFONYL FLUORIDE
George Neil Sausen, Wilmington, Del., assignor to E. I. du Pont de Nemours and Company, Wilmington, Del., a corporation of Delaware
No Drawing. Filed Sept. 29, 1961, Ser. No. 141,592
1 Claim. (Cl. 23—357)

This invention relates to a new nitrogen-fluorine compound and a method for preparing it.

Compounds containing nitrogen-fluorine bonds are of great interest in such fields as high energy propellants and polymerization initiators. However, relatively few nitrogen-fluorine compounds are known; while none containing the sulfur-nitrogen-fluorine link are recorded in the literature.

It has now been found that a new and useful nitrogen-fluorine compound, N,N-difluoroaminosulfonyl fluoride, $FSO_2NF_2$, can be prepared by reacting sulfur dioxide, $SO_2$, with dinitrogen tetrafluoride, $N_2F_4$.

The conditions of the reaction, e.g., time, temperature, pressure, solvent, and ratio of reactants, may vary between wide limits and are not critical; however, the rate of the reaction, whether carried out by batch or continuous process, is greatly increased by ultraviolet radiation.

The reaction temperature can vary from −50° C. to 200° C., but when ultraviolet radiation is used, temperature of 0° C. to 50° C. are preferred, and ordinary temperatures (20–30° C.) are usually used for convenience.

The process is conveniently carried out in a closed system under autogenous pressure; however, higher or lower pressures can be used.

When ultraviolet radiation, the preferred embodiment, is used, an appreciable yield of N,N-difluoroaminosulfonyl fluoride is formed in an hour or less. The yield can be increased by continuing the reaction for times up to several days, although, at temperatures above 150° C., highest yields are realized by stopping the reaction and isolating the product within about one hour.

A solvent is not required, but a solvent inert to the reactants can be used if desired.

Any ratio of reactants can be used, but for maximum efficiency, the 1:1 molar ratio dictated by the stoichiometry of the reaction is preferred.

The product can be purified by preparative scale gas chromatography or by distillation. It is a colorless gas with a boiling point of about −20° C. (vapor-pressure method) and is stable in dry air. It has been found useful as a polymerization initiator as is shown in the examples set forth below.

The examples which follow illustrate but do not limit this invention.

EXAMPLE I

A 200 cc. quartz reactor was evacuated and charged with 0.34 g. of $N_2F_4$ and 0.24 g. of $SO_2$. The mixture was irradiated with a low-pressure mercury-resonance lamp at 25° C. for 2.03 hours. The product gases were transferred to a cylinder and cooled in liquid nitrogen, and the by-product elemental nitrogen was removed by evacuation to leave 0.52 part of crude product. Gas-chromatographic analysis of this product showed it to contain 21% $FSO_2NF_2$ and various amounts of $SO_2$, $N_2F_4$, a mixture of cis- and trans-$N_2F_2$, and $SOF_2$. $FSO_2NF_2$ of greater than 99% purity was obtained as a colorless gas, B.P. −20° C., by gas-chromatographic separation on a column of 20% of the ethyl ester of a tetrachloroundecafluorooctanoic acid on a finely divided diatomaceous-earth support.

*Analysis.*—Calcd. for $F_3NSO_2$: F, 42.2; S, 23.7; mol wt. 135. Found: F, 41.55; S, 23.64; mol wt., 137.

Infrared analysis of the purified product showed major absorption bands at 6.7μ, 8.0μ, 10.85μ (N—F), and 11.2μ (S—F). Mass spectrometric analysis showed m/e 116 fragment as the largest fragment ($FNSO_2^+$) with smaller fragments in agreement with the proposed structure. The fluorine NMR (nuclear magnetic resonance) spectrum showed two peaks at −6175 c.p.s. and −5245 c.p.s. in area ratio of 2/1 (56.4 mc., 1,2-difluorotetrachloroethane=0 reference) in agreement with the above structure.

EXAMPLE II

A 5-liter glass reactor equipped with a quartz well was evacuated and charged with 8.5 g. of $N_2F_4$ and 5.6 g. of $SO_2$. A low-pressure mercury-resonance lamp was inserted into the quartz well, and the contents of the reactor were irradiated by the lamp for 48.3 hours at temperatures of from 20° C. to 30° C. The crude product amounted to 12.8 g. Gas-chromatographic analysis of this product showed it to contain 59% $FSO_2NF_2$, together with $N_2O$, $N_2F_2$, $N_2F_4$, $N_2$, $NF_3$, $SO_2F_2$ and $SOF_2$. The $FSO_2NF_2$ was purified as in Example I to give material of greater than 99% purity.

EXAMPLE III

A small glass reactor was evacuated and charged with equimolar amounts of $SO_2$ and $N_2F_4$, closed, and heated at 100° C. for one hour. Gas-chromatographic analysis of the product mixture showed the presence of $FSO_2NF_2$, along with unreacted $SO_2$ and $N_2F_4$ and a minor amount of $N_2F_2$. $FSO_2NF_2$ can be separated from the mixture by the method of Example I.

As shown by the following examples, $FSO_2NF_2$ is useful as a polymerization initiator.

EXAMPLE A

An 80 cc. shaker tube lined with "Hastelloy C" (the trade name for a well-known alloy of nickel, iron, and molybdenum) was charged with 13.8 g. of tetrafluoroethylene, 33 g. of perfluordimethyl cyclobutane solvent, and 0.02 g. of $FSO_2NF_2$, and the tube was heated with shaking at 103° C. for five hours. The tube was cooled, and a total of 12.2 g. (88%) of white, solid polytetrafluoroethylene was separated from the solvent.

EXAMPLE B

The shaker tube of Example A was charged with 10 g. of tetrafluoroethylene, 30 g. of hexafluoropropylene, 30 g. of perfluorodimethylcyclobutane solvent and 0.02 g. of $FSO_2NF_2$, and the tube was heated at 150° C. for six hours. The tube was cooled, and a total of 7.8 g. of white, solid copolymer of tetrafluoroethylene and hexafluoropropylene was obtained.

EXAMPLE C

The shaker tube of Example A was charged with 12 g. of vinylidene fluoride, 8 g. of hexafluoropropylene, 30 g. of perfluorodimethylcyclobutane solvent, and 0.03 g. of $FSO_2NF_2$. The tube was heated at 225° C. for eight hours and then cooled to room temperature. A total of 8.2 g. of rubbery vinylidene fluoride/hexafluoropropylene copolymer was obtained.

The embodiments of the invention in which an exclusive property or privilege is claimed are defined as follows:

1. The compound N,N-difluoroaminosulfonyl fluoride.

References Cited

UNITED STATES PATENTS

| | | | |
|---|---|---|---|
| 1,412,873 | 4/1922 | Klein | 23—14 |
| 2,753,300 | 7/1956 | Mantell et al. | 204—157 |
| 2,832,667 | 4/1958 | Muttertoes | 23—50 |
| 3,228,936 | 1/1966 | Davis et al. | 260—553 X |

OTHER REFERENCES

Appel et al.: "Angewandte Chemie," vol. 70, p. 572, (1958).

Lustig: "Inorganic Chemistry," vol. 4, pp. 104–106 (January 1965).

Seel et al.: "Zeitschrift Fur Anorganische Und Allgemeine Chemie," vol. 282, pp. 293–306 (p. 300 particularly relied on), 1955.

Young et al.: "Technical Abstract Bulletin," vol. U61-1–6, p. 21 (Mar. 15, 1961).

MILTON WEISSMAN, *Primary Examiner.*

MAURICE A. BRINDISI, *Examiner.*